United States Patent
Eriksson et al.

(10) Patent No.: US 8,848,626 B2
(45) Date of Patent: Sep. 30, 2014

(54) SCHEDULING RETRANSMISSIONS FOR CONTENTION-BASED ACCESS

(75) Inventors: Erik Eriksson, Linkoping (SE); Anna Larmo, Espoo (FI); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 895 days.

(21) Appl. No.: 12/908,310

(22) Filed: Oct. 20, 2010

(65) Prior Publication Data

US 2011/0249632 A1 Oct. 13, 2011

Related U.S. Application Data

(60) Provisional application No. 61/321,628, filed on Apr. 7, 2010.

(51) Int. Cl.
*H04W 4/00* (2009.01)
*H04W 72/00* (2009.01)
*H04W 74/08* (2009.01)
*H04L 1/18* (2006.01)
*H04W 74/02* (2009.01)

(52) U.S. Cl.
CPC ........... *H04L 1/1887* (2013.01); *H04W 74/085* (2013.01); *H04W 74/02* (2013.01)
USPC .......................................... 370/329; 455/450

(58) Field of Classification Search
USPC ........................................................ 370/329
See application file for complete search history.

(56) References Cited

U.S. PATENT DOCUMENTS

| 5,345,594 | A | 9/1994 | Tsuda |
| 5,892,769 | A | 4/1999 | Lee |
| 6,078,568 | A | 6/2000 | Wright et al. |
| 6,240,083 | B1 | 5/2001 | Wright et al. |
| RE37,301 | E | 7/2001 | Lo |

(Continued)

FOREIGN PATENT DOCUMENTS

| CA | 2549326 A1 | 8/2000 |
| WO | 2007/073040 A1 | 6/2007 |

OTHER PUBLICATIONS

3rd Generation Partnership Project. "Retransmissions for Contention Based access." 3GPP TSG-RAN WG2 Meeting #69, R2-101392, San Francisco, California, USA, Feb. 22-26, 2010.

(Continued)

*Primary Examiner* — Gerald Smarth
(74) *Attorney, Agent, or Firm* — Coats & Bennett, PLLC

(57) ABSTRACT

A base station supports a contention-based channel and a schedule-based channel. If too many mobile terminals simultaneously transmit on the contention-based channel, the base station schedules retransmissions to those terminals on the schedule-based channel. Supporting this, a terminal transmits a user transmission on the contention-based channel that includes both a data transmission and a reference signal. The terminal derives this reference signal by selecting one of a plurality of cyclic shifts (CSs). Correspondingly, the base station receives the user transmission and can determine the selected CS even if it is unable to demodulate the data transmission. The base station then determines a retransmission identifier (RTI) mapped to that CS, according to a mapping between CSs and RTIs, and sends scheduling information for any needed retransmission to the terminal by addressing that information to the RTI. Meanwhile, the terminal knows this mapping and monitors for scheduling information addressed to that RTI.

20 Claims, 5 Drawing Sheets

(56) References Cited

U.S. PATENT DOCUMENTS

| | | | |
|---|---|---|---|
| 6,967,937 | B1 | 11/2005 | Gormley |
| 7,468,972 | B2 | 12/2008 | Walsh et al. |
| 7,715,864 | B2 | 5/2010 | Zangi |
| 2005/0053029 | A1 | 3/2005 | Lee et al. |
| 2005/0149649 | A1 | 7/2005 | Carneal et al. |
| 2006/0040702 | A1 | 2/2006 | Willenegger et al. |
| 2007/0038736 | A1 | 2/2007 | Jorgensen |
| 2008/0316957 | A1* | 12/2008 | Shen et al. .................. 370/328 |
| 2008/0316961 | A1* | 12/2008 | Bertrand et al. ............ 370/329 |
| 2009/0103558 | A1 | 4/2009 | Zangi et al. |
| 2009/0268685 | A1* | 10/2009 | Chen et al. .................. 370/329 |
| 2010/0070815 | A1* | 3/2010 | Papasakellariou et al. ... 714/748 |
| 2010/0080187 | A1* | 4/2010 | Papasakellariou et al. ... 370/329 |
| 2010/0105405 | A1* | 4/2010 | Vujcic ...................... 455/452.1 |
| 2010/0210243 | A1* | 8/2010 | Vujcic .......................... 455/411 |
| 2010/0248765 | A1* | 9/2010 | Chun et al. .................. 455/509 |
| 2011/0239072 | A1* | 9/2011 | Cai .............................. 714/748 |
| 2011/0249548 | A1* | 10/2011 | Gaal et al. .................... 370/206 |

OTHER PUBLICATIONS

3rd Generation Partnership Project. "SR Associated Contention Based Transmission." 3GPP TSG-RAN WG2 Meeting #69, R2-101115, San Francisco, California, USA, Feb. 22-26, 2010.

3rd Generation Partnership Project. "Discussion on Contention Resolution of CB Transmission." 3GPP TSG-RAN WG2 Meeting #69, R2-101101, San Francisco, California, USA, Feb. 22-26, 2010.

3rd Generation Partnership Project. "The Feedback and Retransmission for the Contention Based Transmission." 3GPP TSG-RAN WG2 Meeting #69, R2-101059, San Francisco, California, USA, Feb. 22-26, 2010.

3rd Generation Partnership Project. "Contention Based Uplink Transmissions." 3GPP TSG-RAN WG2 #66bis, R2-093812, Los Angeles, California, USA, Jun. 29-Jul. 3, 2009.

Larmo, A, et al. "The LTE Link-Layer Design", IEEE Communications Magazine, IEEE Service Center, Piscataway, New Jersey, USA, vol. 47, No. 4, Apr. 1, 2009, pp. 52-59.

Amirijoo, M. et al. "On Self-Optimization of the Random Access Procedure in 3G Long Term Evolution", Integrated Network Management-Workshops, IFIP/IEEE International Symposium on, Piscataway, New Jersey, USA, Jun. 1, 2009, pp. 177-184.

Rivest, R. L "Network Control by Bayesian Broadcast." IEEE Transactions on Information Theory, vol. IT-22, No. 3, May 1987, pp. 323-328.

Phan, V. "Smart Packet Access and Call Admission Control for Efficient Resource management in Advanced Wireless Networks." Academic Dissertation, University of Oulu, Finland, 2005.

Tobias, F. et al. "The Winner II Air Interface: Refined Multiple Access Concepts." IST-4-027756 Winner II, D4.6.1 Version 1.0, Nov. 30, 2006.

Bertsekas, D. et al. Data Networks (Second Edition). Prentice-Hall, Inc., Upper Saddle River, NJ, 1992. pp. 271-288.

Pakes, A.G. "Some Conditions for Ergodicity and Recurrence of Markov Chains." Operations Research, 1983, vol. 31, pp. 783-789.

Roberts, L.G. "Aloha Packet System with and without Slots and Capture." Stanford Research Institute, Advanced Research Projects Agency, Network Information Center, Apr. 1975. Available at: http://packet.cc/files/aloha.html.

Munkres, J. R. Topology: A First Course. Prentice-Hall, Inc., Englewood Cliffs, New Jersey, 1975. pp. 45-51.

Chitre, D. M. et al. "Random Access with Notification—A New Multiple-Access Scheme for VSAT Networks." Comsat Technical Review, No. 1, Clarksburg, MD, US, Spring 1989.

Baron, H. Office Action mailed Oct. 1, 2009 in co-pending U.S. Appl. No. 11/875,576, filed Oct. 19, 2007.

Baron, H. Final Office Action mailed Mar. 18, 2010 in co-pending U.S. Appl. No. 11/875,576, filed Oct. 19, 2007.

Baron, H. Office Action mailed Aug. 24, 2010 in co-pending U.S. Appl. No. 11/875,576, filed Oct. 19, 2007.

* cited by examiner

SCHEDULING RETRANSMISSIONS FOR CONTENTION-BASED ACCESS

RELATED APPLICATIONS

This application claims priority to U.S. Provisional Patent Application Ser. No. 61/321,628, titled "Scheduling Retransmissions for Contention-Based Access," filed 7 Apr. 2010, and incorporated herein by reference in its entirety.

FIELD OF THE INVENTION

The present invention generally relates to managing multiple access to a communication link, such as the uplink in a wireless communication network, and particularly relates to scheduling retransmissions for contention-based access.

BACKGROUND

As current and future wireless communication networks transition away from circuit-switched communications and toward packet-switched communications, resource allocation becomes more flexible and more challenging. For example, in packet-switched environments, resource allocations tend to be made on a demand basis. Further, resource allocations to individual users tend to be of short duration, reflecting the bursty, intermittent nature of many packet-switched communication applications, such as web browsing, etc.

As one example, packet-based communication applications and services complicate the allocation of common uplink resources in cellular and other wireless communication networks, such as where a potentially large group of users in a given cell share a common communication uplink. One sharing approach depends on resource reservation techniques, wherein individual users access the common uplink on a reserved basis. Scheduling access to the communication link in this manner has the advantage of controlling the group of users in a manner that avoids conflicting transmissions (i.e., simultaneous transmission on the same physical resource by more than one user) but the scheduling request/grant signaling adds potentially significant overhead to the communication link, and adds complexity to the managing base station.

As an alternative, contention-based access offers potentially greater communication link efficiency by eliminating the signaling overhead of scheduled access. With contention-based access, a grant for access to a contention-based channel is broadcast to a cell. Any uplink time aligned user can respond to that grant by opportunistically transmitting on the contention-based channel, even if the user has not been allocated a grant on the schedule-based channel. With each user vying for access to the contention-based channel transmitting autonomously, collisions between user transmissions occur from time to time. Commonly, the base station or other receiving entity can demodulate data from more than one user's transmission at the same time, so collisions do not necessarily mean loss of user data. However, interference or practical constraints on processing resources generally limits the number of simultaneous user transmissions that can be successfully received.

Without provisions to stagger or otherwise disperse Hybrid Automatic Resend Request (HARQ) retransmissions on the contention-based channel, users involved in a collision may attempt retransmissions at or about the same time, thereby risking yet another collision. Such potentially reduces or eliminates the efficiency gains that come with the elimination of scheduling overhead from the communication link.

SUMMARY

A base station herein supports both a contention-based channel and a schedule-based channel of a communication link, e.g., a wireless communication uplink. Mobile terminals transmit user transmissions autonomously on the contention-based channel, on an as-needed basis. As a point of significant advantage, if too many terminals simultaneously transmit on the contention-based channel, the base station schedules retransmissions to those terminals on the schedule-based channel.

Supporting such scheduled retransmissions, a mobile terminal according to various embodiments transmits a user transmission that includes not only a data transmission, but also a reference signal that will facilitate rescheduling of the user transmission, if needed. To derive this reference signal, the terminal selects one of a plurality of cyclic shifts and shifts a base sequence (e.g., a Zadoff-Chu sequence) according to the selected cyclic shift.

Correspondingly, a base station herein receives a user transmission from a mobile terminal on the contention-based channel and determines the cyclic shift that was selected by the terminal, by detecting the reference signal. Notably, the base station may be able to detect the reference signal, and thus determine the selected cyclic shift, even if it is unable to demodulate the data transmission, e.g., because too many users simultaneously transmitted on the contention-based channel.

Having determined the cyclic shift selected by the terminal, the base station then determines a retransmission identifier mapped to that cyclic shift, according to a defined mapping between cyclic shifts and retransmission identifiers. If the base station indeed fails to demodulate the data transmission, it can use this retransmission identifier for sending information to the terminal about a scheduled retransmission of the user transmission. In particular, the base station schedules a retransmission on the schedule-based channel and then sends scheduling information for that retransmission to the terminal by addressing the scheduling information to the determined retransmission identifier.

For example, in some embodiments, the base station sends scheduling information to a particular terminal in a unicast message. In this case, the base station sets the destination address field of the message to the retransmission identifier determined for that terminal. In other embodiments, though, the base station sends scheduling information to a particular terminal in a multicast message. In this case, the base station sends a multicast message to a plurality of mobile terminals that contains different scheduling information for different mobile terminals, but internally addresses scheduling information within the multicast message that is for the particular terminal to the determined retransmission identifier.

Regardless, a mobile terminal also has knowledge of the defined mapping between cyclic shifts and retransmission identifiers, and can therefore receive any scheduling information addressed to it in this way. That is, after selecting the cyclic shift for deriving the reference signal, the mobile terminal determines which of a plurality of retransmission identifiers is mapped to that selected cyclic shift, according to the mapping between cyclic shifts and retransmission identifiers. The terminal then correspondingly monitors for and receives any scheduling information addressed to the determined retransmission identifier. If the terminal does indeed receive such scheduling information, e.g., because the base station was unable to demodulate the data transmission as sent over the contention-based channel, the mobile terminal may then retransmit the user transmission on the schedule-based channel according to that scheduling information.

With regard to the particular manner in which a mobile terminal selects a cyclic shift, in some embodiments the terminal makes that selection randomly. By making the selection randomly, a mobile terminal likely will select a different cyclic shift than another mobile terminal simultaneously transmitting on the contention-based channel, and will therefore use a cyclic shift mapped to a different retransmission identifier. These embodiments typically contemplate the base station as the entity performing link adaptation, so that the terminal need not use costly out-of-band control signaling to explicitly signal a selected transport format to the base station.

Notably, though, in other embodiments the mobile terminal performs link adaptation and implicitly signals a selected transport format to the base station with the cyclic shift; that is, without out-of-band control signaling. More particularly, the mobile terminal autonomously selects a transport format for the data transmission on the contention-based channel, e.g., based on channel conditions, and then selects a cyclic shift that is mapped to that transport format, according to a mapping between transport formats and cyclic shifts. Because the channel conditions experienced by the terminal will likely be different from that experienced by other mobile terminals, the transport format selected for the data transmission and thereby the selected cyclic shift will likely be different from that selected by other mobile terminals. Then, with the base station also having knowledge of the mapping between transport formats and cyclic shifts, it may likewise determine the transport format selected by a terminal.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
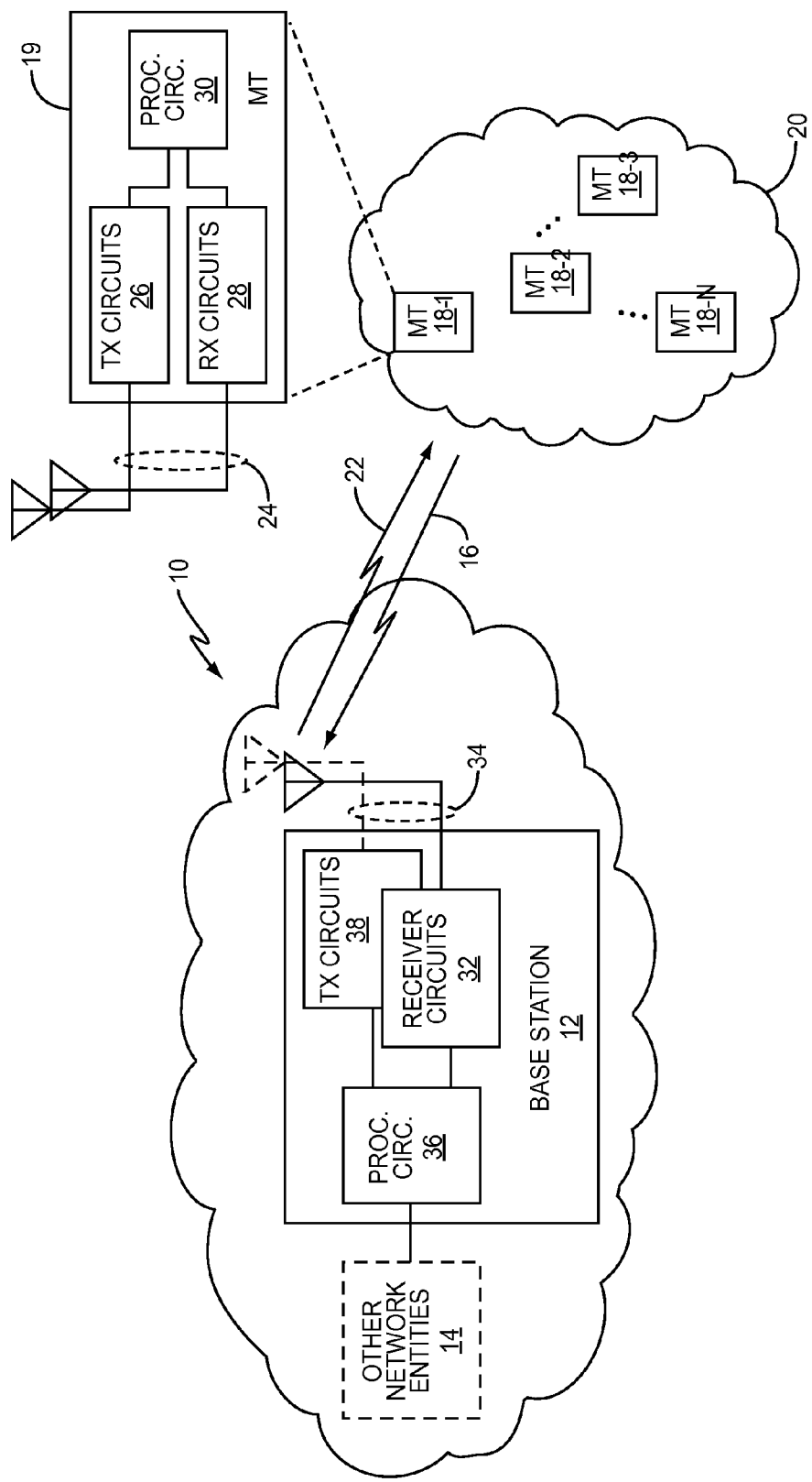
FIG. 1 is a block diagram of a wireless communication system, including a base station configured to manage multiple user access to a communication link, and a mobile terminal configured for such user access.

By way of non-limiting example, FIG. 1 illustrates a wireless communication system 10, which includes a base station 12 and one or more other entities 14. The base station 12 provides an uplink communications channel 16 for receiving user transmissions from individual mobile terminals 18-1, 18-2 . . . 18-N in a group 20 of N mobile terminals (also conveniently referred to as "users"). The base station 12 further provides a downlink communications channel 22 for sending transmissions to mobile terminals 18 in the group 20, including control signaling.

The base station 12 supports both a contention-based (CB) channel and a schedule-based (SB) channel of the communications uplink 16, along with a corresponding control channel of the downlink 22 for managing access to the uplink 16. Each of the individual mobile terminals 18 transmits user transmissions autonomously on the CB channel, on an as-needed basis. While such autonomous transmission requires less signaling overhead than scheduled transmission on the SB channel, interference or practical constraints on processing resources at the base station 12 generally limits the number of simultaneous user transmissions that the base station 12 can successfully receive. As a point of significant advantage, then, if too many users simultaneously transmit on the CB channel, the base station 12 schedules retransmissions to those users on the SB channel.

Supporting such scheduled retransmissions, the mobile terminal 18-1 illustrated in FIG. 1 with greater detail includes one or more transmit/receive antennas 24, along with associated transmitter (TX) and receiver (RX) circuits 26 and 28, respectively, and further includes one or more processing circuits 30. The TX circuits 26 are configured to transmit a user transmission to the base station 12 on the CB channel of the uplink 16. This user transmission includes not only a data transmission, but also a reference signal. The reference signal will facilitate demodulation of the data transmission at the base station 12 and, as advantageously taught herein, will also facilitate a scheduled retransmission of the data transmission, if needed. The processing circuit(s) 30 are configured to derive this reference signal. In particular, the processing circuit(s) 30 select one of a plurality of cyclic shifts (CSs) and derive the reference signal from a base sequence by shifting that sequence according to the selected CS.

At the base station 12, RX circuits 32 are configured to receive the user transmission from the mobile terminal 18-1 on the CB channel, via one or more transmit/receive antennas 34. As noted above, the user transmission includes a data transmission as well as a reference signal, with the reference signal having been derived from a base sequence that was shifted according to a CS selected by the mobile terminal 18-1. One or more processing circuits 36 operatively associated with the RX circuits 32 are configured to determine this CS, by detecting the reference signal included in the user transmission. Notably, the processing circuit(s) 36 may be able to detect the reference signal, and thus determine the CS, even if the processing circuit(s) 36 are unable to demodulate the data transmission, e.g., because too many users simultaneously transmitted on the CB channel. Reference signals associated with different CSs may, for example, be orthogonal, meaning that they do not interfere with one another so long as the CSs are distinct.

Having determined the CS associated with the user transmission, the processing circuit(s) 36 determine a retransmission identifier (RTI) mapped to that CS, based on a defined mapping between CSs and RTIs. If the processing circuit(s) 36 indeed fail to demodulate the data transmission, the circuit(s) 36 can use this RTI for sending information to the mobile terminal 18-1 about a scheduled retransmission of the user transmission. In particular, upon failing to demodulate the data transmission, the processing circuit(s) 36 are configured to schedule a retransmission of the user transmission on the SB channel and to then send scheduling information for the scheduled retransmission to the mobile terminal 18-1, by addressing the scheduling information to the determined RTI.

Meanwhile, the mobile terminal 18-1 has knowledge of the same defined mapping between CSs and RTIs, and can therefore receive any such scheduling information from the base station 12. That is, after selecting the CS for deriving the reference signal, the processing circuit(s) 30 at the mobile terminal 18-1 are configured to determine which of a plurality of RTIs is mapped to that selected CS according to the defined mapping between CSs and RTIs. The RX circuits 28 are correspondingly configured to monitor for and receive any scheduling information addressed to the determined RTI. If the RX circuits 28 do indeed receive such scheduling information, e.g., because the base station 12 was unable to demodulate the data transmission as sent over the CB channel, the mobile terminal 18-1 may then retransmit the user transmission on the SB channel according to that scheduling information.

In some embodiments, the base station 12 sends scheduling information to mobile terminals 18 in unicast messages. In this case, the base station 12 sends scheduling information to a particular mobile terminal 18-1 by setting the destination address field of a corresponding unicast message to the RTI determined for that terminal 18-1. Likewise, the terminal 18-1 monitors for and receives unicast messages with the destination address field set to that RTI. With other unicast messages addressed to different RTIs, and other terminals 18 therefore monitoring for different RTIs, the terminal 18-1 is the only one that receives the unicast message and the scheduling information contained therein.

In other embodiments, though, the base station 12 sends scheduling information to mobile terminals 18 in multicast messages. In this case, the base station 12 sends a multicast message to a plurality of mobile terminals 18 that contains different scheduling information for different mobile terminals 18. In doing so, the base station 12 internally addresses scheduling information within the multicast message that is for a particular terminal 18-1 to the retransmission identifier determined for that terminal 18-1. In general, then, different scheduling information in the multicast message is internally addressed to different retransmission identifiers associated with different terminals 18.

Irrespective of the specific manner in which scheduling information is addressed with RTIs, the defined mapping between RTIs and CSs may be pre-configured in the base station 12 and/or a mobile terminal 18-1. In various embodiments, for example, the mapping is pre-defined according to some standard. For instance, one such standard mapping defines RTIs with respect to a Contention-Based Radio Network Temporary Identifier (CB-RNTI) for the CB channel, where a CB-RNTI identifies a particular CB channel resource. Multiple different RTIs are defined for a particular CB channel resource by adding different indexes associated with different CSs to the corresponding CB-RNTI (where the CSs are indexed from 1 to M, with M being the number of CSs in a set of possible CSs). Thus, assuming all terminals 18 transmitting on the CB channel using a particular CB channel resource select a different CS, the CS used by each terminal 18 will map to a different RTI. In this way, the standard mapping will permit the base station 12 to address different scheduling information to different RTIs (i.e., terminals).

Of course, as suggested above, the defined mapping between RTIs and CSs may simply be pre-configured in the base station 12, whereupon the base station 12 signals the mapping to one or more of the mobile terminals 18. In some embodiments, for example, the base station 12 broadcasts the mapping to a plurality of mobile terminals 18. In other embodiments, the base station 12 signals the mapping via Radio Resource Control (RRC) signaling. In still other embodiments, the base station 12 actually performs the mapping, rather than it being pre-configured therein, before signaling the mapping to one or more mobile terminals 18.

Figure 2:
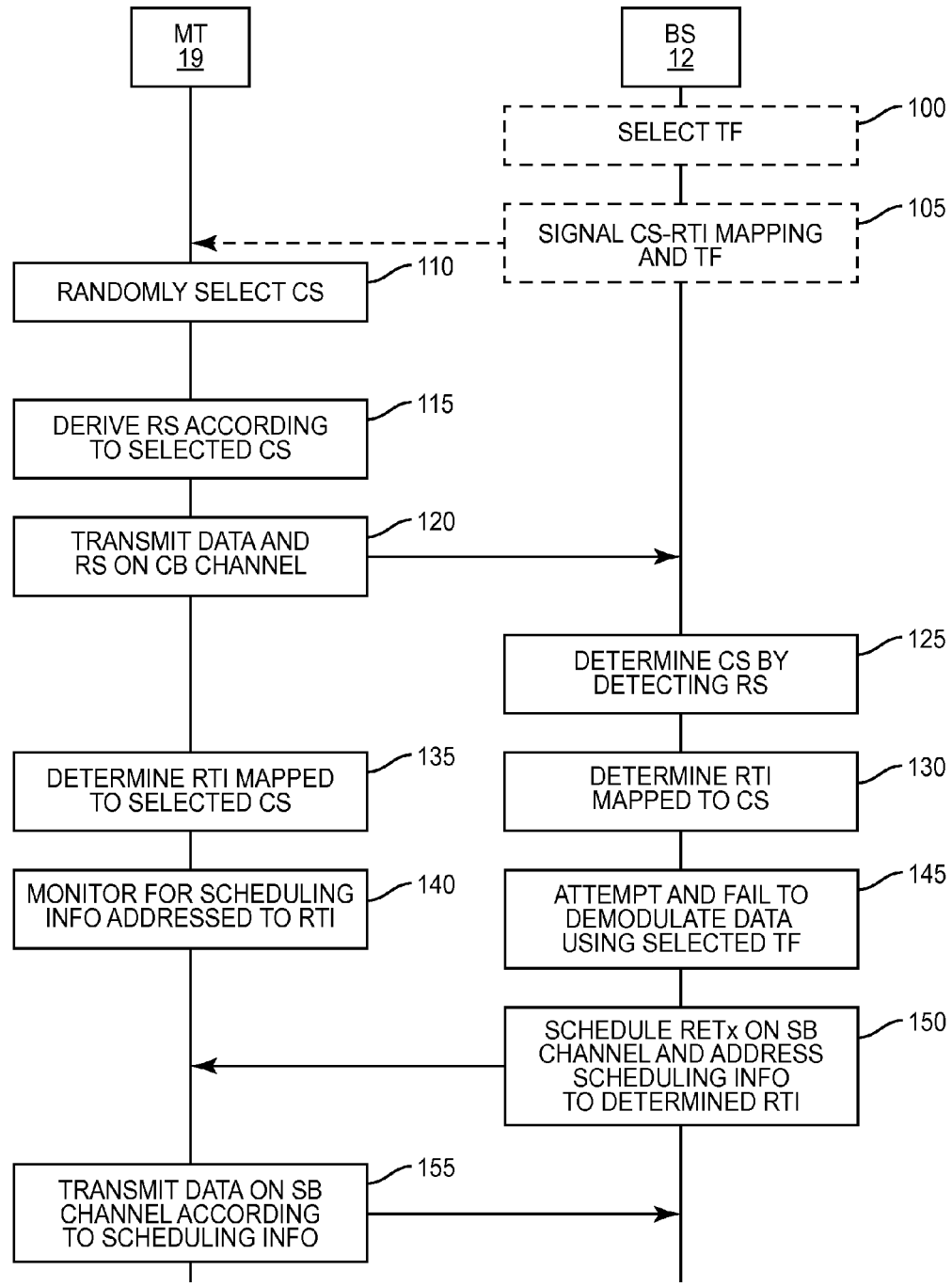
FIG. 2 is a call flow diagram illustrating some embodiments of managing multiple user access to a communication link, using a cyclic shift randomly selected by a mobile terminal.

With regard to the particular manner in which a mobile terminal 18-1 selects a CS, in some embodiments the mobile terminal 18-1 makes that selection randomly. By making the selection randomly, the mobile terminal 18-1 likely will select a different CS than another mobile terminal 18 simultaneously transmitting on the CB channel, and will therefore use a CS mapped to a different RTI. FIG. 2 illustrates one example of this embodiment in the context of transport format selection.

In FIG. 2, the base station 12 selects a transport format, TF, (e.g., a modulation and coding scheme, MCS, and other transmission parameters) for a mobile terminal's data transmission on the CB channel (Block 100). In selecting the TF, the base station 12 performs dynamic link adaptation of the uplink 16, e.g., every transmission time interval, to account for variations in the CB channel conditions. The base station 12 then signals the selected TF along with the mapping between CSs and RTIs via downlink control signaling (Block 105).

Having received this control signaling, the mobile terminal 18-1 randomly selects a CS from a set of possible CSs (Block 110) and derives a reference signal (RS) according to that selected CS (Block 115). The mobile terminal 18-1 then transmits a user transmission on the CB channel that includes a data transmission and the derived RS (Block 120).

When the base station 12 receives this user transmission, it detects the RS and thereby determines the associated CS (Block 125). Based on the mapping between RTIs and CSs (the one signaled to the mobile terminal 18-1), the base station 12 determines the RTI mapped to that CS (Block 130). Despite successfully detecting the RS in the user transmission, the base station 12 nonetheless fails to demodulate the data transmission using the TF it selected and signaled to the mobile terminal 18-1 (Block 145). Accordingly, the base station 12 schedules a retransmission of the user transmission on the SB channel and addresses scheduling information for that retransmission to the determined RTI (Block 150).

Meanwhile, the mobile terminal 18-1 itself determines the RTI mapped to the CS it randomly selected (Block 135). After monitoring for scheduling information addressed to that RTI (Block 140), such as by monitoring the destination address field of unicast messages sent over a downlink control channel, the mobile terminal 18-1 eventually receives that scheduling information. The mobile terminal 18-1 then retransmits the user transmission on the SB channel according to that scheduling information (Block 155).

Note that in the example of FIG. 2 above, the base station 12 performs (i.e., dictates) dynamic link adaptation of the uplink 16 rather than the mobile terminal 18-1. That is, the base station 12 dynamically selects a TF that the mobile terminal 18-1 should use for the uplink 16 and communicates the selected TF to the terminal 18-1 via downlink control signaling. The mobile terminal 18-1 must then use the TF signaled to it by the base station 12; it cannot autonomously select a different TF to use for the uplink. The base station 12 thus knows the TF used in the uplink by virtue of having selected it.

In many cases, however, the mobile terminal 18-1 may be better suited for determining which TF to use in the uplink 16 than the base station 12. In these cases, the terminal 18-1 could of course autonomously select the TF to use, but complications then arise because the base station 12 no longer inherently know which TF is used. Prior approaches suggest that the terminal 18-1 explicitly communicate the selected TF to the base station 12 using costly out-of-band control signaling, or that the base station 12 expend considerable processing resources to blindly detect the TF in use.

Figure 3:
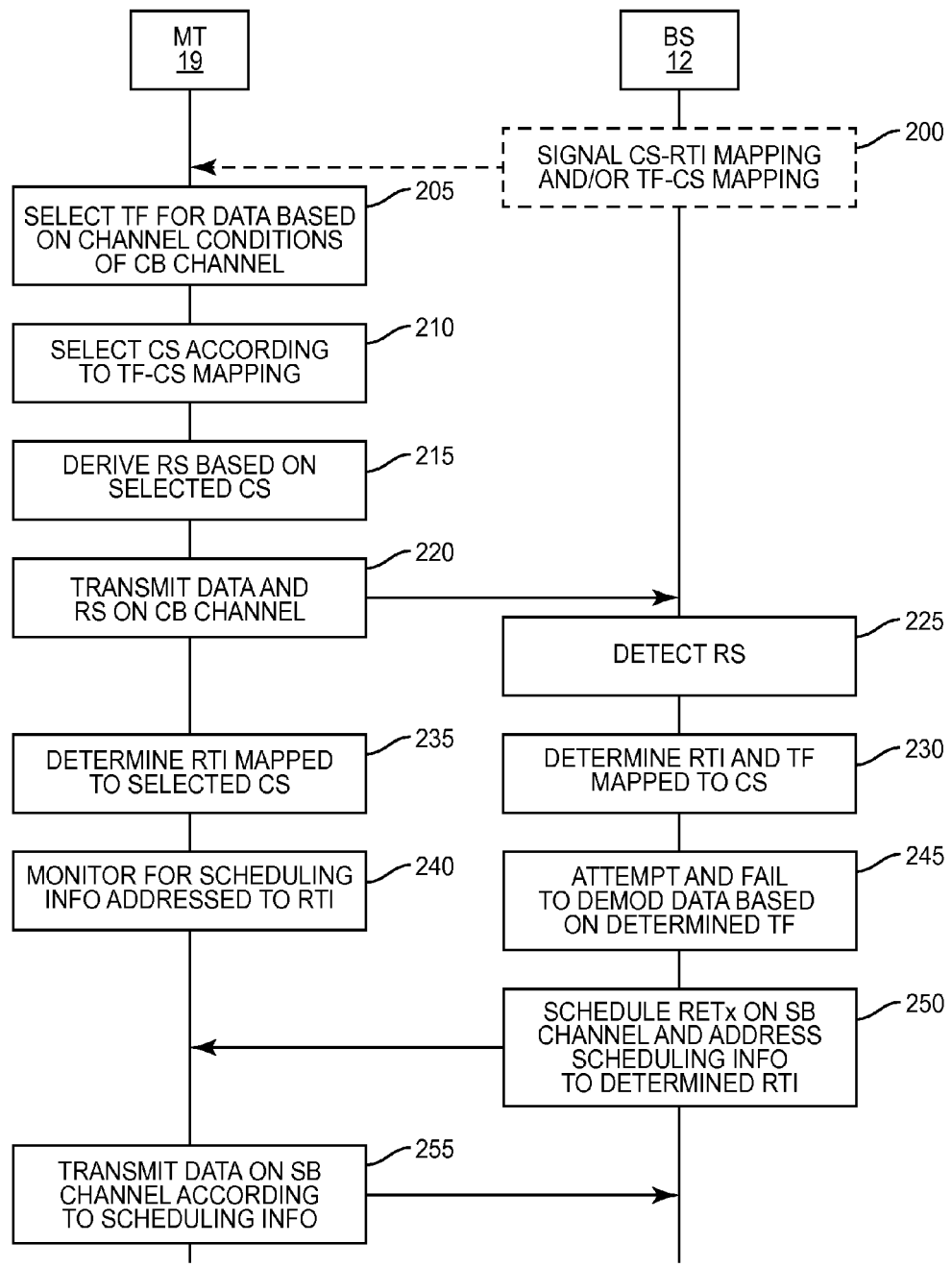
FIG. 3 is a call flow diagram illustrating other embodiments of managing multiple user access to a communication link, using a cyclic shift selected by a mobile terminal according to a mapping between cyclic shifts and transport formats.

In advantageous embodiments taught herein, though, the mobile terminal 18-1 implicitly signals the selected TF to the base station 12 with the CS. These embodiments thereby permit the mobile terminal 18-1 to dictate link adaptation of the uplink 16 without requiring use of costly out-of-band control signaling to signal the selected TF, and without requiring significant processing at the base station 12. FIG. 3 illustrates an example of these embodiments.

In the example of FIG. 3, a mapping exists between CSs and RTIs, as well as between CSs and TFs. Either or both of these mappings may be pre-configured in either or both of the base station 12 and the mobile terminal 18-1. Or, as before, the base station 12 may signal either or both of the mappings to the mobile terminal 18-1, e.g., via RRC signaling or cell broadcast (Block 200).

Regardless, the mobile terminal 18-1 selects one of a plurality of pre-determined TFs for the data transmission on the CB channel (Block 205). The selection of TF may be based on the channel conditions of the CB channel experienced by the mobile terminal 18-1. Alternatively or additionally, the selection may be based on how much or what type of data is queued in the mobile terminal 18-1 for transmission to the base station 12, the estimated path loss between the mobile terminal 18-1 and the base station 12, or previously selections of TFs.

In any event, the mobile terminal 18-1 then selects a CS mapped to the selected TF according to the mapping between TFs and CSs (Block 210). In particular, the mobile terminal 18-1 determines which CS(s) are mapped to the selected TF. If only one CS is mapped to the selected TF, the mobile terminal 18-1 of course selects that CS. If more than one CS is mapped to the selected TF, the mobile terminal 18-1 may select from those CSs at random, or according to a pre-determined selection algorithm. Because the channel conditions experienced by the mobile terminal 18-1 will likely be different from that experienced by other mobile terminals 18, the TF selected for the data transmission and thereby the selected CS may also be different from that selected by other mobile terminals 18.

Having selected a CS in this manner, the mobile terminal 18-1 derives the RS from a base sequence shifted according to that selected CS (Block 215). Similar to above, the mobile terminal 18-1 then transmits a user transmission on the CB channel that includes a data transmission and that RS (Block 220).

When the base station 12 receives this user transmission, it detects the RS and thereby determines the associated CS (Block 225). The base station 12 then determines the RTI and TF mapped to the CS associated with the detected RS, according to the above described mappings (Block 230). Having determined the TF with which the mobile terminal 18-1 sent the data transmission, the base station 12 attempts to demodulate the data transmission based on that TF (Block 245). If the base station 12 fails to demodulate the data transmission, it schedules a retransmission on the SB channel and addresses scheduling information for the scheduled retransmission to the determined RTI (Block 250).

Meanwhile, the mobile terminal 18-1, having itself determined the RTI mapped to the CS it selected for deriving the RS (Block 235), monitors for and receives scheduling information addressed to that RTI (Block 240). The mobile terminal 18-1 then retransmits the user transmission on the SB channel according to that scheduling information (Block 255).

It should be noted that while the above approaches to CS selection facilitate the selection of different CSs for different mobile terminals 18, that may not always occur. Different mobile terminals 18 may sometimes randomly select the same CS. Or, although mobile terminals 18 likely experience different channel conditions, a limited set of TFs may cause different mobile terminals 18 to nonetheless select the same TF. If only one or very few CSs are mapped to any given TF, this again means that different mobile terminals 18 may sometimes select the same CS.

In the case that different mobile terminals 18 select the same CS, and the base station 12 detects this occurrence, the base station 12 in some embodiments refrains from scheduling retransmissions to those terminals 18 since they will likely be unsuccessful. Higher layer protocols would have to detect the loss of this data and retransmit that data at a later stage if needed. Notwithstanding this, the above approaches still advantageously permit the base station 12 to schedule retransmissions for what will likely be the majority of terminals 18 that simultaneously transmit on the CB channel with different CSs.

In this regard, the above figures and examples have described the various embodiments of the present invention with respect to just one of the mobile terminals 18-1 for illustrative purposes. Those skilled in the art will readily appreciate, of course, that the above processes occur for each of a plurality of mobile terminals 18 vying for access to the CB channel. That is, the base station 12, by nature of the various mappings described herein, can effectively identify specific mobile terminals 18, or addresses associated with those specific mobile terminals 18, for scheduling retransmissions thereto.

Those skilled in the art will also appreciate that the above processes may be carried out as part of a larger process, e.g., a hybrid automatic resend request (HARQ) process. That is, the base station 12 may send individualized acknowledgements (ACKs) or negative acknowledgements (NACKs) to a mobile terminal 18-1 for indicating the base station's success or failure in demodulating the data transmission received from that terminal 18-1. The base station 12 in some embodiments sends such a NACK before sending scheduling information to the mobile terminal 18-1 for rescheduling the failed user transmission on the schedule-based channel. In this case, responsive to receiving a NACK, the mobile terminal 18-1 may buffer the user transmission for retransmission at some later scheduled time and begin monitoring for scheduling information.

Of course, HARQ signaling is subject to small, but nonetheless non-negligible error. Thus, in some embodiments, even if a mobile terminal 18-1 receives an ACK for a user transmission, a mobile terminal 18-1 still retransmits the user transmission on the SB channel if it receives scheduling information for that transmission. That is, scheduling information generally takes precedence over any HARQ signaling received by the mobile terminal 18-1.

Those skilled in the art will also appreciate that these teachings are applicable to a wide range of system types, communication channelization schemes, etc. In some embodiments, for example, the wireless communication system 10 comprises a Long Term Evolution (LTE) cellular network in accordance with the relevant Third Generation Partnership Project (3GPP) standards, or an "IMT Advanced" cellular network in accordance with the relevant International Telecommunications Union (ITU) standards. In these embodiments, the reference signal included by a mobile terminal 18-1 in the user transmission on the CB channel comprises a Demodulation Reference Signal (DMRS).

This DMRS is derived according to a base sequence that comprises a Zadoff-Chu sequence, which has favorable correlation properties. For example, the cross-correlation between different sequences is low. For low bandwidth allocations, computer-generated sequences are used instead, to increase the number of available sequences.

Furthermore, in at least some of these embodiments, a random base sequence is selected for each transmission slot, based on the cell identity for the serving LTE base station 12, to avoid the use of the same reference signal in two adjacent cells. The cyclic shift by which this randomly selected base sequence is shifted may also be selected based on the cell identity for the serving LTE base station 12. That is, the base sequence may be initially shifted by some cyclic shift selected based on the cell identity for the serving LTE base station 12, meaning that two or more mobile terminals 18 simultaneously transmitting on the CB channel would otherwise transmit the same DMRS. According to many embodiments, though, the base sequence used for any given mobile terminal 18-1 is subsequently shifted by a CS discussed above, i.e., the CS mapped to that mobile terminal 18-1 by the base station 12, the CS randomly selected by that mobile terminal 18-1, or the CS selected by the mobile terminal 18-1 based on a TF selected by the mobile terminal 18-1.

Figure 4:
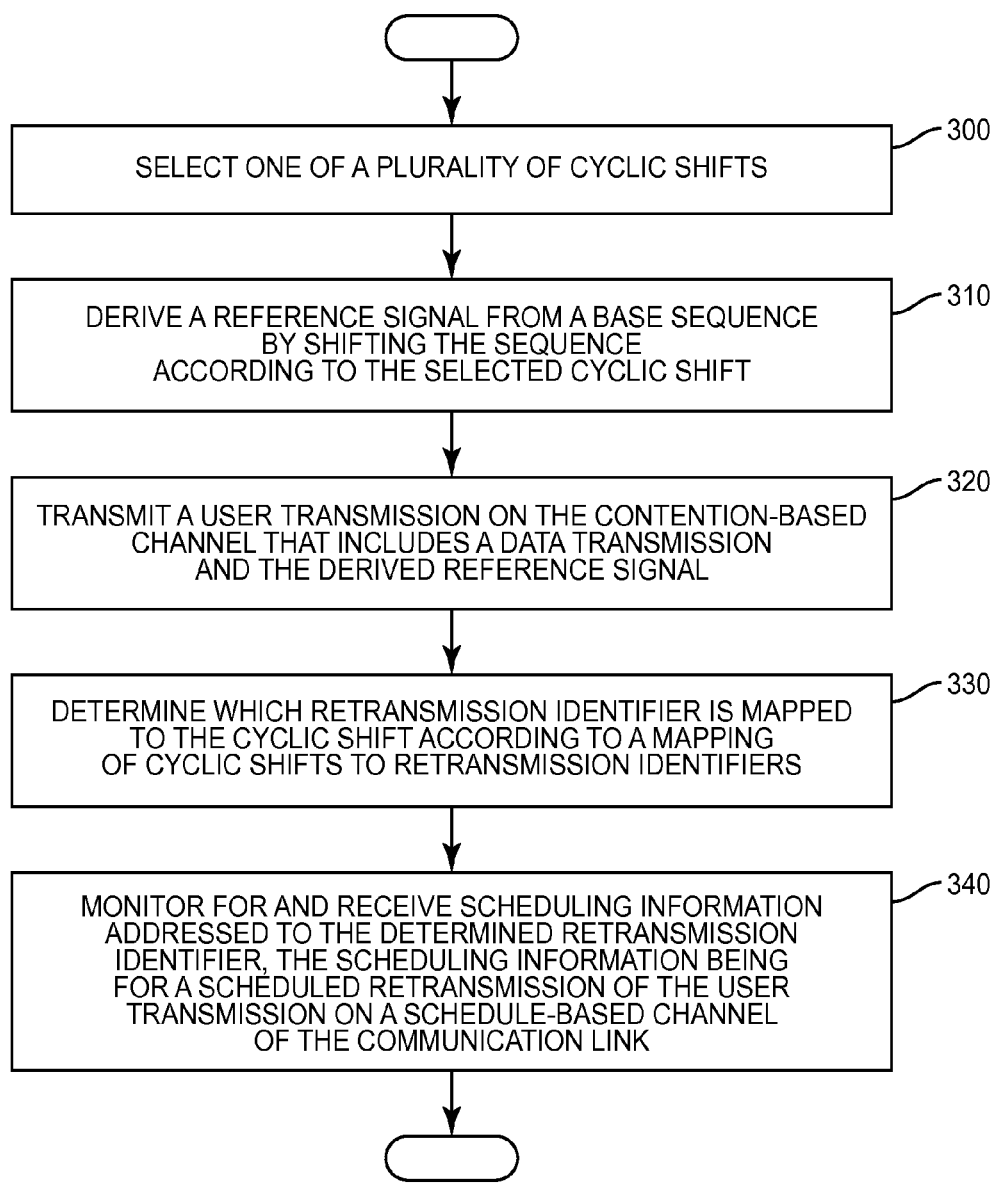
FIG. 4 is a logic flow diagram of a method in a mobile terminal for user access to a communication link, according to various embodiments of the present invention.
Figure 5:
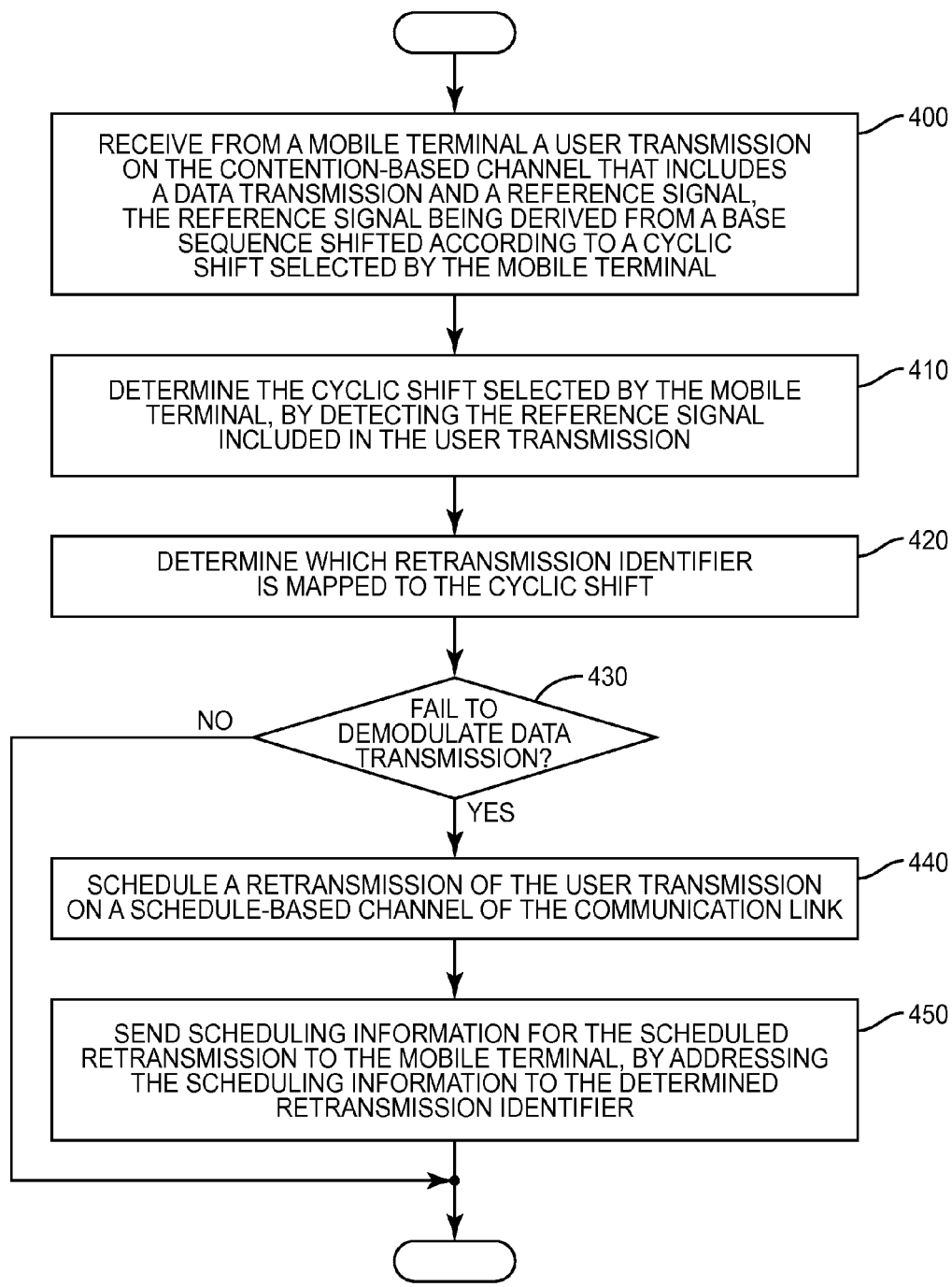
FIG. 5 is a logic flow diagram of a method in a base station for managing multiple user access to a communication link, according to various embodiments of the present invention.

With the above variations and modifications in mind, those skilled in the art will appreciate that a mobile terminal 18-1 and base station 12 as taught herein generally perform the methods illustrated in FIGS. 4 and 5, respectively. In FIG. 4, for example, a method in a mobile terminal 18-1 "begins" by selecting one of a plurality of CSs (Block 300) and then deriving a reference signal from a base sequence by shifting the sequence according to that selected CS (Block 310). The method also includes transmitting to the base station 12 a user transmission on the CB channel of a communication link (Block 320). As discussed above, this user transmission includes a data transmission and the derived reference signal. The method further includes determining which of a plurality of RTIs is mapped to that CS according to a mapping between CSs and RTIs (Block 330). Of course, Block 320 and Block 330 especially may be performed in any order. Regardless, the method "ends" by monitoring for and receiving scheduling information addressed to the determined RTI (Block 340). Again, this scheduling information relates to a scheduled retransmission of the user transmission on the SB channel of the communication link.

In FIG. 5, by contrast, a method in a base station 12 for managing multiple user access to a communication link "begins" with receiving from a mobile terminal 18-1 a user transmission on a CB channel of the communication link (Block 400). This user transmission includes a data transmission and a reference signal. The reference signal, as noted above, is derived from a base sequence that is shifted according to a CS selected by the mobile terminal 18-1. The method then includes determining the CS selected by the mobile terminal 18-1, by detecting the reference signal included in the user transmission (Block 410), and determining which of a plurality of RTIs is mapped to that CS according to a mapping between CSs and RTIs (Block 420).

If the base station 12 succeeds in demodulating the data transmission included in the user transmission ("NO" from Block 430), the method ends. On the other hand, if the base station 12 fails to demodulate the data transmission ("YES" from Block 430), the method continues. In particular, the method then includes scheduling a retransmission of the user transmission on a SB channel of the communication link (Block 440). Finally, the method "ends" with sending scheduling information for the scheduled retransmission to the mobile terminal 18-1, by addressing the scheduling information to the determined RTI (Block 450).

Those skilled in the art will appreciate that the various "circuits" described may refer to a combination of analog and digital circuits, and/or one or more processors configured with software and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method in a base station for managing multiple user access to a communication link, the method comprising:
   receiving from a mobile terminal a user transmission on a contention-based channel of the communication link, the user transmission including a data transmission and a reference signal, the reference signal being derived from a base sequence that is shifted according to a cyclic shift selected by the mobile terminal;
   determining the cyclic shift selected by the mobile terminal, by detecting the reference signal included in the user transmission;
   determining which of a plurality of retransmission identifiers is mapped to that cyclic shift according to a defined mapping between cyclic shifts and retransmission identifiers; and
   upon failing to demodulate the data transmission included in the user transmission:
      scheduling a retransmission of the user transmission on a schedule-based channel of the communication link; and
      sending scheduling information for the scheduled retransmission to the mobile terminal, by addressing the scheduling information to the determined retransmission identifier.

2. The method of claim 1, wherein the mobile terminal selects one of a plurality of pre-determined transport formats for the data transmission and selects a cyclic shift mapped to the selected transport format according to a mapping between cyclic shifts and transport formats, and wherein the method further comprises:
   determining which of the pre-determined plurality of transport formats is mapped to the cyclic shift according to the mapping between cyclic shifts and transport formats; and
   attempting to demodulate the data transmission based on the determined transport format.

3. The method of claim 1, further comprising broadcasting the defined mapping between cyclic shifts and retransmission identifiers to a plurality of mobile terminals, including said mobile terminal.

4. The method of claim 1, wherein the defined mapping between cyclic shifts and retransmission identifiers comprises a mapping between indexes associated with cyclic shifts and retransmission identifiers, the retransmission identifiers each comprising an identifier for the contention-based channel added to a different index.

5. The method of claim 1, wherein sending scheduling information for the scheduled retransmission to the mobile terminal comprises sending a unicast message containing the scheduling information to the mobile terminal, by setting a destination address field of that unicast message to the determined retransmission identifier.

6. The method of claim 1, wherein sending scheduling information for the scheduled retransmission to the mobile terminal comprises sending a multicast message to a plurality of mobile terminals that contains different scheduling information for different mobile terminals, and internally addressing scheduling information within the multicast message that is for said mobile terminal to the determined retransmission identifier.

7. The method of claim 1, wherein the communication link comprises a link in a Long Term Evolution (LTE) wireless communications system, and wherein the reference signal comprises a Demodulation Reference Signal (DMRS) that is derived from a Zadoff-Chu base sequence.

8. A base station in a wireless communication system configured to manage multiple user access to a communication link supported by the base station, said base station comprising:
  receiver circuits configured to receive from a mobile terminal a user transmission on a contention-based channel of the communication link, the user transmission including a data transmission and a reference signal, the reference signal being derived from a base sequence that is shifted according to a cyclic shift selected by the mobile terminal; and
  one or more processing circuits operatively associated with the receiver circuits and configured to:
    determine the cyclic shift selected by the mobile terminal, by detecting the reference signal included in the user transmission;
    determine a retransmission identifier mapped to that cyclic shift, based on a defined mapping between cyclic shifts and retransmission identifiers; and
    upon failing to demodulate the data transmission included in the user transmission:
      schedule a retransmission of the user transmission on a schedule-based channel of the communication link; and
      send scheduling information for the scheduled retransmission to the mobile terminal, by addressing the scheduling information to said retransmission identifier.

9. The base station of claim 8, wherein the mobile terminal selects one of a plurality of pre-determined transport formats for the data transmission and selects a cyclic shift mapped to the selected transport format according to a mapping between cyclic shifts and transport formats, and wherein the one or more processing circuits are further configured to:
  determine which of the pre-determined plurality of transport formats is mapped to the cyclic shift according to the mapping between cyclic shifts and transport formats; and
  attempt to demodulate the data transmission based on the determined transport format.

10. The base station of claim 8, further comprising transmitter circuits configured to broadcast the defined mapping between cyclic shifts and retransmission identifiers to a plurality of mobile terminals, including said mobile terminal.

11. The base station of claim 8, wherein the defined mapping between cyclic shifts and retransmission identifiers comprises a mapping between indexes associated with cyclic shifts and retransmission identifiers, the retransmission identifiers each comprising an identifier for the contention-based channel added to a different index.

12. The base station of claim 8, wherein the one or more processing circuits are configured to send a unicast message containing the scheduling information to the mobile terminal, by setting a destination address field of that unicast message to the determined retransmission identifier.

13. The base station of claim 8, wherein the one or more processing circuits are configured to send a multicast message to a plurality of mobile terminals that contains different scheduling information for different mobile terminals, and internally address scheduling information within the multicast message that is for said mobile terminal to the determined retransmission identifier.

14. The base station of claim 8, wherein the base station is in a Long Term Evolution (LTE) wireless communications system, and wherein the reference signal comprises a Demodulation Reference Signal (DMRS) that is derived from a Zadoff-Chu base sequence.

15. A method in a mobile terminal for user access to a communication link, the method characterized by:
  selecting one of a plurality of cyclic shifts;
  deriving a reference signal from a base sequence by shifting the sequence according to the selected cyclic shift;
  transmitting to a base station a user transmission on a contention-based channel of the communication link, the user transmission including a data transmission and the derived reference signal;
  determining which of a plurality of retransmission identifiers is mapped to that cyclic shift according to a defined mapping between cyclic shifts and retransmission identifiers; and
  monitoring for and receiving scheduling information addressed to the determined retransmission identifier, the scheduling information being for a scheduled retransmission of the user transmission on a schedule-based channel of the communication link.

16. The method of claim 15, where selecting one of a plurality of cyclic shifts comprises randomly selecting one of the plurality of cyclic shifts.

17. The method of claim 15, where selecting one of a plurality of cyclic shifts comprises:
  selecting one of a plurality of pre-determined transport formats for the data transmission based on channel conditions of the contention-based channel experienced by the mobile terminal; and
  selecting a cyclic shift mapped to the selected transport format according to a mapping between cyclic shifts and transport formats.

18. A mobile terminal configured for user access to a communication link, the mobile terminal comprising:
  one or more processing circuits configured to:
    select one of a plurality of cyclic shifts;
    derive a reference signal from a base sequence by shifting the sequence according to the selected cyclic shift; and
    determine which of a plurality of retransmission identifiers is mapped to that cyclic shift according to a defined mapping between cyclic shifts and retransmission identifiers;

transmitter circuits configured to transmit to a base station a user transmission on a contention-based channel of the communication link, the user transmission including a data transmission and the derived reference signal; and receiver circuits configured to monitor for and receive scheduling information addressed to the determined retransmission identifier, the scheduling information being for a scheduled retransmission of the user transmission on a schedule-based channel of the communication link.

19. The mobile terminal of claim 18, where the one or more processing circuits are configured to randomly select one of a plurality of cyclic shifts.

20. The mobile terminal of claim 18, where the one or more processing circuits are configured to:
   select one of a plurality of pre-determined transport formats for the data transmission based on channel conditions of the contention-based channel experienced by the mobile terminal; and
   select a cyclic shift mapped to the selected transport format according to a mapping between cyclic shifts and transport formats.

* * * * *